United States Patent
Carlson

(10) Patent No.: US 10,158,427 B2
(45) Date of Patent: Dec. 18, 2018

(54) CELESTIAL NAVIGATION USING LASER COMMUNICATION SYSTEM

(71) Applicant: BAE SYSTEMS INFORMATION AND ELECTRONIC SYSTEMS INTEGRATION INC., Nashua, NH (US)

(72) Inventor: Robert T. Carlson, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/457,081

(22) Filed: Mar. 13, 2017

(65) Prior Publication Data
US 2018/0262271 A1    Sep. 13, 2018

(51) Int. Cl.
| H04B 10/118 | (2013.01) |
| B64G 3/00 | (2006.01) |
| G01C 21/02 | (2006.01) |
| G01C 21/16 | (2006.01) |
| G01S 3/786 | (2006.01) |
| G01S 5/16 | (2006.01) |

(52) U.S. Cl.
CPC ............. *H04B 10/118* (2013.01); *B64G 3/00* (2013.01); *G01C 21/025* (2013.01); *G01C 21/165* (2013.01); *G01S 3/7867* (2013.01); *G01S 5/163* (2013.01)

(58) Field of Classification Search
CPC combination set(s) only.
See application file for complete search history.

(56) References Cited

U.S. PATENT DOCUMENTS

| 5,119,225 A * | 6/1992 | Grant | H04B 10/118 244/158.4 |
| 5,155,327 A | 10/1992 | Hoag | |
| 5,808,732 A | 9/1998 | Llewely | |
| 6,195,044 B1 * | 2/2001 | Fowell | B64G 1/28 342/355 |
| 6,285,927 B1 | 9/2001 | Li et al. | |
| 6,504,502 B1 | 1/2003 | Wu et al. | |

(Continued)

OTHER PUBLICATIONS

Nguyen (NPL Doc. "Laser Beacon Tracking for Free-space Optical Communication on Small-Satellite Platforms in Low-Earth Orbit" —Massachusetts Institute of Technology Sep. 2015.*
Pszczel, M. B., and D. Bucco. Review of techniques for in-flight transfer alignment. No. ARL-GW-TM-012. Aeronautical Research Labs Melbourne (Australia), 1992.

(Continued)

*Primary Examiner* — David Payne
*Assistant Examiner* — Omar S Ismail
(74) *Attorney, Agent, or Firm* — Sand & Sebolt, LPA

(57) ABSTRACT

A laser communication system its integrated microradian-accuracy Acquisition and Tracking Sensor (ATS) to perform a celestial navigation fix to determine the attitude of the laser communications payload, including the integrated ATS and the co-boresighted laser beam, prior to establishing a laser communication link with a second vehicle such as a high-altitude aircraft or satellite. The laser communication system may use a legacy platform INS to initially point its narrow FOV ATS at one or more stars to obtain the vehicle's attitude therefrom. Then the precision payload attitude determined with the ATS star tracker fix is used to point the co-boresighted laser beam to establish a laser communications link with the second vehicle.

18 Claims, 3 Drawing Sheets

(56) References Cited

U.S. PATENT DOCUMENTS

| | | | |
|---|---|---|---|
| 8,213,803 | B2 | 7/2012 | Wu et al. |
| 9,260,335 | B1 | 2/2016 | Miller et al. |
| 2009/0152391 | A1* | 6/2009 | McWhirk ................. B64B 1/02 244/30 |
| 2009/0214216 | A1* | 8/2009 | Miniscalco .......... H04B 10/112 398/89 |
| 2009/0324236 | A1* | 12/2009 | Wu ...................... H04B 10/118 398/122 |
| 2011/0261187 | A1* | 10/2011 | Wang ................... G01C 21/165 348/113 |
| 2015/0219767 | A1* | 8/2015 | Humphreys ............ G01S 19/43 342/357.26 |
| 2016/0043800 | A1* | 2/2016 | Kingsbury ........... H04B 10/118 398/125 |
| 2016/0046387 | A1* | 2/2016 | Frolov .................... B64C 39/02 244/59 |

OTHER PUBLICATIONS

Nguyen, Tam Nguyen Thuc. Laser beacon tracking for free-space optical communication on small-satellite platforms in low-earth orbit. Diss. Massachusetts Institute of Technology, 2015.

Guelman M et al., "Acquisition and pointing control for inter-satellite laser communications", IEEE Transactions on Aerospace and Electronic Systems, IEEE Service Center, Piscataway, NJ, US, vol. 40, No. 4, Oct. 31, 2004 (Oct. 31, 2004), pp. 1239-1247, XP002623388, ISSN: 0018-9251, D01: 10.1109/TAES.2004. 1386877. Section II; p. 1240-p. 1242.

EP Search Report, EP 18160004.0, dated Jul. 10, 2018, 9 pages.

\* cited by examiner

1

CELESTIAL NAVIGATION USING LASER COMMUNICATION SYSTEM

BACKGROUND

Technical Field

The present disclosure relates generally to laser communication between high-altitude aircraft or space systems. More particularly, the present disclosure in one embodiment relates to a laser communication system that utilizes its embedded Acquisition and Tracking Sensor (ATS) to observe one or more stars to precisely establish the first vehicle position and attitude to enable the pointing of a very narrow laser communication beam at a second vehicle, based on the first vehicle precision attitude knowledge.

Background Information

One of the key technologies for optical inter-satellite communication equipment is the highly accurate acquisition and tracking of the corresponding satellite or vehicle. An integrated Acquisition and Tracking Sensor (ATS) that is part of a laser communication system on high altitude vehicles, such as spacecraft, aircraft, and satellites, enables laser-based optical inter-vehicle communication. The ATS position and jitter sensing of the received optical energy enables precision laser beam pointing and stabilization, which is essential for observation or surveillance satellites and airborne vehicles that must transmit and receive large amounts of data, typically at very high data rates.

Prior to the ATS detecting the laser beam from a corresponding satellite or vehicle, there is a field of uncertainty (FOU) pertaining to the region in which the corresponding satellite or vehicle is located. The ATS must search this FOU for the corresponding satellite or vehicle with a sequential step-stare search process that will generally require a few minutes. It is understood that reducing this acquisition time from a few minutes to a few seconds is beneficial to more quickly and efficiently establish a communication link between corresponding vehicles and/or satellites.

SUMMARY

One issue with the current state of the art in laser communications systems is the length of time, typically minutes, required for one vehicle or satellite to establish an initial laser communication link with a corresponding satellite/vehicle. Thus, a need exists for a solution to more quickly establish the initial link between satellites and/or airborne vehicles in high altitude environments. The present disclosure addresses this and other issues by making use of the ATS that is native to the laser communication system to also perform a star tracker celestial navigation fix to greatly reduce the acquisition FOU. This reduction of the FOU enables rapid acquisition and establishment of the laser link between the two platforms. This is an exemplary benefit of this patent disclosure. Another exemplary benefit is the use of the ATS as a star tracker for the precision position and attitude determination required to establish the laser communication link, without the need for the Global Positioning System (GPS). Thus, the celestial fix obtained with the integrated ATS enables the laser communication link to be rapidly established, even in a degraded or denied GPS environment, and without the need and expense of a separate star tracker.

In one aspect, the present disclosure may provide a method including: the laser communication system inertial measurement unit (IMU) and ATS to point at a star having a known location, wherein the laser beam is co-boresighted to the ATS FOV carried by a first platform; determining attitude of the first platform based, at least in part, on the ATS and gimbal measurement of the angular orientation of one or more stars; aiming the ATS and co-boresighted laser beam within a field of uncertainty, wherein a second platform is within the field of uncertainty but an exact location is not yet known; scanning the field of uncertainty with the ATS and co-boresight laser beam until the ATS identifies the second platform; establishing a laser communication link between the first platform and the second platform; and transferring data between the first platform and the second platform over the laser communication link.

In another aspect, the present disclosure may provide a system comprising: a legacy star tracker or inertial navigation system (INS) on a first platform, wherein the platform INS/star tracker enables pointing of the laser communications system ATS; at least one processor and associated memory for identifying a star or other celestial body above a threshold brightness at a fixed location from a star catalog; attitude determination logic calculating the attitude of the ATS on the first platform based in part on the known location of the celestial body relative to the first platform; wherein the attitude determination logic further determines the pointing vector required for directing the laser and co-boresighted ATS towards the second platform for establishing a laser communication link therewith; and a laser communication link between the first platform and the second platform established after the attitude of the laser communication system has been determined using the INS, the ATS, and the known location of the celestial body. Additionally, the system may include provision for the temporary removal or substitution of the very narrow ATS optical bandpass filter used during laser communications acquisition and tracking, (e.g. 0.3-10 nm wide in the 1550 nm region), in operative communication with the ATS for passing star light in a very broad spectral range (e.g., from 1100 nm to 1600 nm) while performing the star tracker function for a celestial navigation fix.

In another aspect, the present disclosure may provide a laser communication system with its integrated microradian-accuracy Acquisition and Tracking Sensor (ATS) to perform a celestial navigation fix to determine the attitude of the laser communications payload, including the integrated ATS and the co-boresighted laser beam, prior to establishing a laser communication link with a second vehicle such as a high-altitude aircraft or satellite. The laser communication system may use a legacy platform INS to initially point its narrow field of view (FOV) ATS at one or more stars to obtain the vehicle's attitude therefrom. Then the precision payload attitude determined with the ATS star tracker fix is used to point the co-boresighted laser beam to establish a laser communications link with the second vehicle.

In another aspect, the present disclosure may provide method comprising: pointing a laser communications beam of a laser communication system including an integrated Acquisition and Tracking Sensor (ATS) towards a celestial body having a known location, wherein the laser communications beam is co-boresighted to the ATS carried by a first platform; determining attitude of the first platform based, at least in part, on the ATS of the laser communication system pointed at and tracking a star; aiming the laser beam within a field of uncertainty, wherein a second platform is within the field of uncertainty; scanning the field of uncertainty with the laser beam until the laser beam illuminates the second platform; establishing a laser communication link between the first platform and the second platform; and transferring data between the first platform and the second platform over the laser communication link.

In yet another aspect, an embodiment of the present disclosure may provide at least one non-transitory computer readable storage medium having instructions encoded thereon that, when executed by one or more processors, result in the following operations for establishing laser communications between two high altitude platforms, the operations comprising: pointing the acquisition and tracking sensor (ATS) in a laser communication payload toward a star having a 'relatively fixed' position; determining an attitude of the first platform based, at least in part, on the ATS pointed at and tracking the star; aiming the laser beam towards a second platform within a field of uncertainty about the second platform, wherein the laser beam is precisely co-boresighted with the acquisition and tracking sensor (ATS) in a laser communication payload carried by a first platform; scanning the field of uncertainty with the first platform laser beam until the laser beam illuminates the second platform; establishing a laser communication link between the first platform and the second platform; and transferring data between the first platform and the second platform over the laser communication link.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

By way of additional background, and in accordance with one aspect of an embodiment, the present disclosure may provide a laser communication system for air-to-air (i.e., vehicle-to-vehicle), air-to-satellite (i.e., vehicle-to-satellite), or satellite-to-satellite laser links. In each scenario, the laser communication system of the present disclosure operates at high altitudes above atmospheric clouds, or in outer space. Regarding the laser communication link established between the vehicles/satellites, the communications over the laser could be anything similar to what is conventionally sent over an RF link between platforms (i.e. vehicles or satellites). Generally, the communication includes sensor data from surveillance sensors or earth resources/imaging. Typically the sensor data needs to go from one airborne or satellite platform to another airborne platform or satellite.

The laser beam within the laser communication system carries this prime mission sensor data or other data. The laser communication beams are very narrow, typically in a range of about 10-100 microradians. The narrow laser beam 26 (FIG. 2) is advantageous inasmuch as it provides high directionality by providing more watts per square meter at the target and is able to get high data rates over long distances. But, because the laser beam is narrow, it must be pointed very accurately. This is where the advantage identified by the present disclosure is established. Generally, in an air-to-air, air-to-satellite, or satellite-to-satellite application, the platforms are cooperative in some sense. The first platform generally knows about/approximately where the second platform is located (because ground control has told the first platform, or the platform has other information available to it). However, the first platform does not know accurately enough where the second platform is located to quickly point the narrow laser beam at the second platform. Typically, the first platform has go through an acquisition search sequence.

Figure 1:
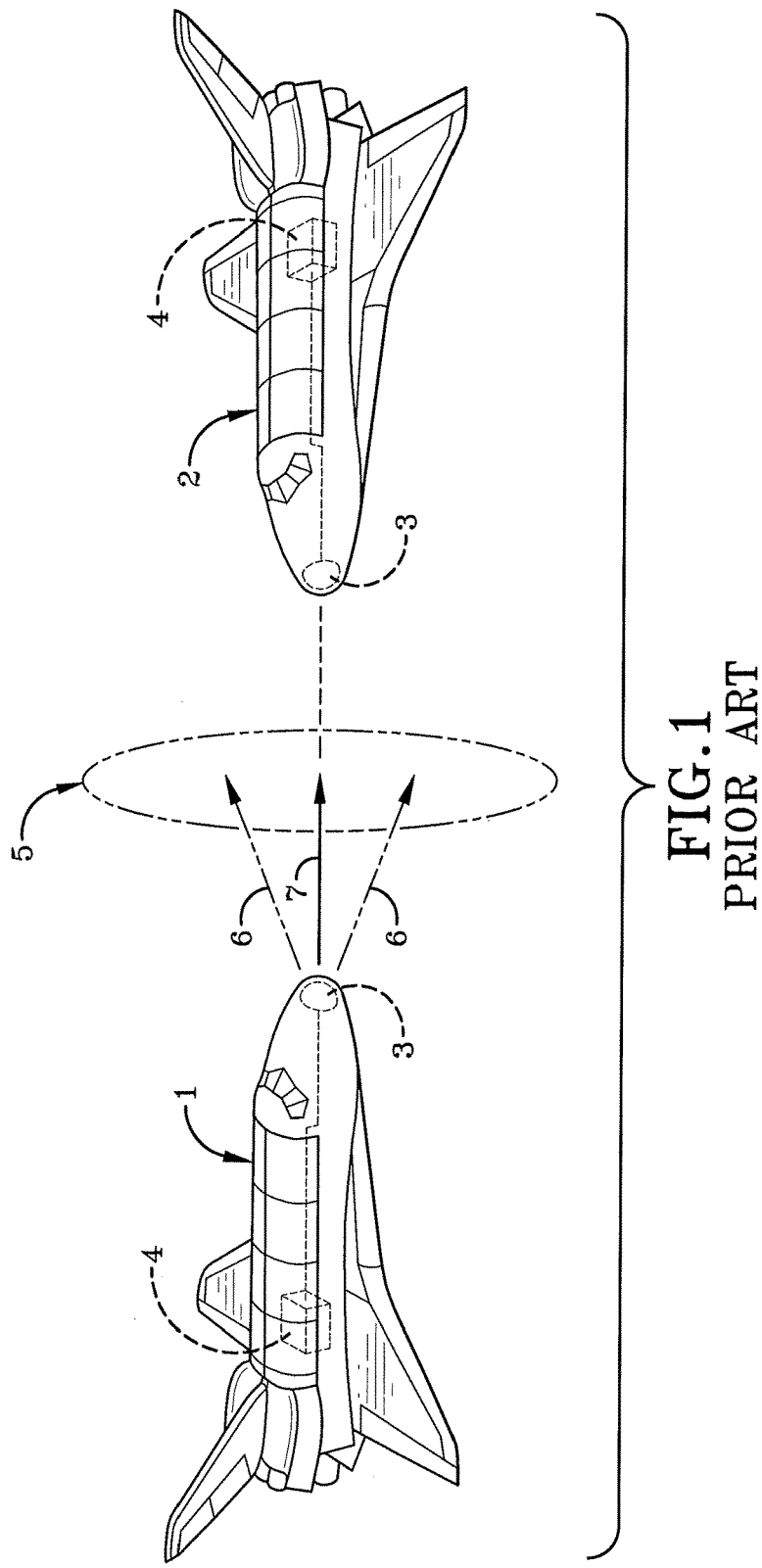
FIG. 1 is a diagrammatic view of an exemplary initial acquisition sequence between a first vehicle and a second vehicle utilizing conventional (i.e., Prior Art) techniques.

FIG. 1 diagrammatically depicts a conventional PRIOR ART acquisition sequence with a first vehicle (or first platform) 1, a second vehicle (or second platform) 2, each platform carrying a laser communications payload that includes a local inertial measurement unit (IMU) 4 and an ATS 3, the host platform INS (which is often coupled with the ATS 3), a field of uncertainty (FOU) 5 that is larger than the ATS field of view (FOV) 6, and a laser beam 7 that is boresighted to the center of the laser communications payload ATS FOV 6. A conventional/typical acquisition sequence requires the pixels of a focal plane array in the ATS 3 (i.e., its FOV) on first vehicle 1 to be pointed in a step-stare search process to discover where a second platform 2 is located within a FOU 5, since the ATS 3 on first platform 1 does not initially know exactly where the second platform 2 is located in that FOU 5 space. Both platforms 1, 2 are searching for each other, potentially taking turns, with a respective ATS 3 to view the uncertainty region 5 of where the other platform should be located. During this gimbal pointing and ATS search one of the platforms (for example first vehicle 1) at least uses its laser 7 with a wide beam or a wider beam in FOV 6 and performs a step-stare raster scan or a spiral scan or other search pattern, to gradually point at various regions in the FOU 5 to see if it gets a response back from the other platform, such as second vehicle 2. Once the ATS on first platform 1 sees that the second platform 2 is pointed at it, then the first platform 1 quickly points its narrow laser beam at the second platform 2 so that they both see each other, pull in, and track on the incoming laser beam, which precisely points their outgoing co-boresighted laser beam, thus enabling laser communications using these very narrow laser beams 7. This acquisition sequence for searching the FOU 5 takes 1 to 10 minutes for typical uncertainty volumes based on GPS position data, which is generally very good, but the platform INS 4 attitude accuracy is generally much less accurate.

Thus, more precise attitude accuracy is essential to reduce the time for the search process, because this reduces the FOU to be searched to mutually acquire and precisely point the very narrow laser beams at each other. This advantage of reduced FOU and acquisition search time, using the laser communications payload ATS 3 to perform a star tracker function and obtain a celestial fix without the need for a star tracker on the host platform, is a exemplary advantage provided by the system, device, and method of the present disclosure.

By way of additional background, transfer alignment is generally used on the first platform 1 when the first platform 1 is attempting to initiate this link the second platform 2. Even if the first platform 1 (i.e., the first spacecraft) has a top-of-the-line inertial navigation system (INS), there is still an uncertainty basket (i.e., the FOU) that is relatively large as far as laser communication beam widths are concerned. However, the laser communication payload with its IMU and ATS, and the platform INS are not typically co-located on the platform, but are separated by a substantial distance. One exemplary non-limiting location of the laser communication payload IMU 4 for an airborne application (also referred to as the optical module (OM)) may be located approximately ⅔rds of the way back in the aircraft and mounted to the upper surface of the aircraft so that it can look through a window upwards to see stars, satellites, or other aircraft, or it may be mounted near a side window where it can still look upwards but also point sideways to other aircraft. That laser communication payload also has an inertial measurement unit IMU that is sensing its attitude and velocity vector. But, the IMU is not as accurate as the platform INS located elsewhere in the aircraft or satellite.

Another point relating to transfer alignment is that vibration varies at different mounting locations on the platform, and disturbances such as aircraft lifting forces or wind loads, or satellite g-release forces can cause slight bending of the platform. Given the microradian tolerances required for precision pointing of the 10-100 microradian laser beam, what the laser communication payload IMU experiences at its mounting location (e.g., near the rear end of the aircraft) may be remarkably different than what's being measured elsewhere (e.g., in the cockpit with the aircraft INS). Generally, the platform INS, perhaps located near the cockpit, is good at accurately determining velocity, vector, and GPS position and the basic low frequency information associated with its location. However, the platform INS lacks the ability to determine the high frequency vibration experienced elsewhere at the laser communications payload, because as the separation increases the jitter and the physical bending of structure/frame sensed at the laser communications payload IMU is very different from what the remotely located platform INS is sensing. Therefore, the local IMU 3 which is part of the laser communication payload 3 in FIG. 1 is used to sense the local laser communications payload vibrations and disturbances that are high frequency. Transfer alignment is the process of blending the local high frequency data from the IMU 3 together with the low frequency attitude and heading data from the platform INS 4 (in FIG. 1) in order to determine where the laser beam is pointing. However, there are inherent measurement inaccuracies and errors associated with the transfer alignment process that blends the precise, low frequency data from the platform INS with the local high frequency data from the laser communication payload IMU.

Thus, the present disclosure provides an improved way to use the ATS integrated within the laser communications payload to perform a star tracker function to establish a more accurate attitude calculation to determine where the laser beam is pointing. In conjunction with conventional gimbal pointing angle feedback devices such as resolvers, encoders, or rheostats, this higher precision reduces the FOU for pointing the laser beam, and hence reduces the time required for the initial acquisition sequence between a first platform and a second platform. In one embodiment, the present disclosure utilizes the laser communications payload gimbal and ATS to point at one or more stars for a celestial navigation fix to establish high accuracy attitude knowledge of the payload pointing, then that precision attitude may be used to point toward the second platform to complete the acquisition search sequence at a faster rate.

Figure 2:
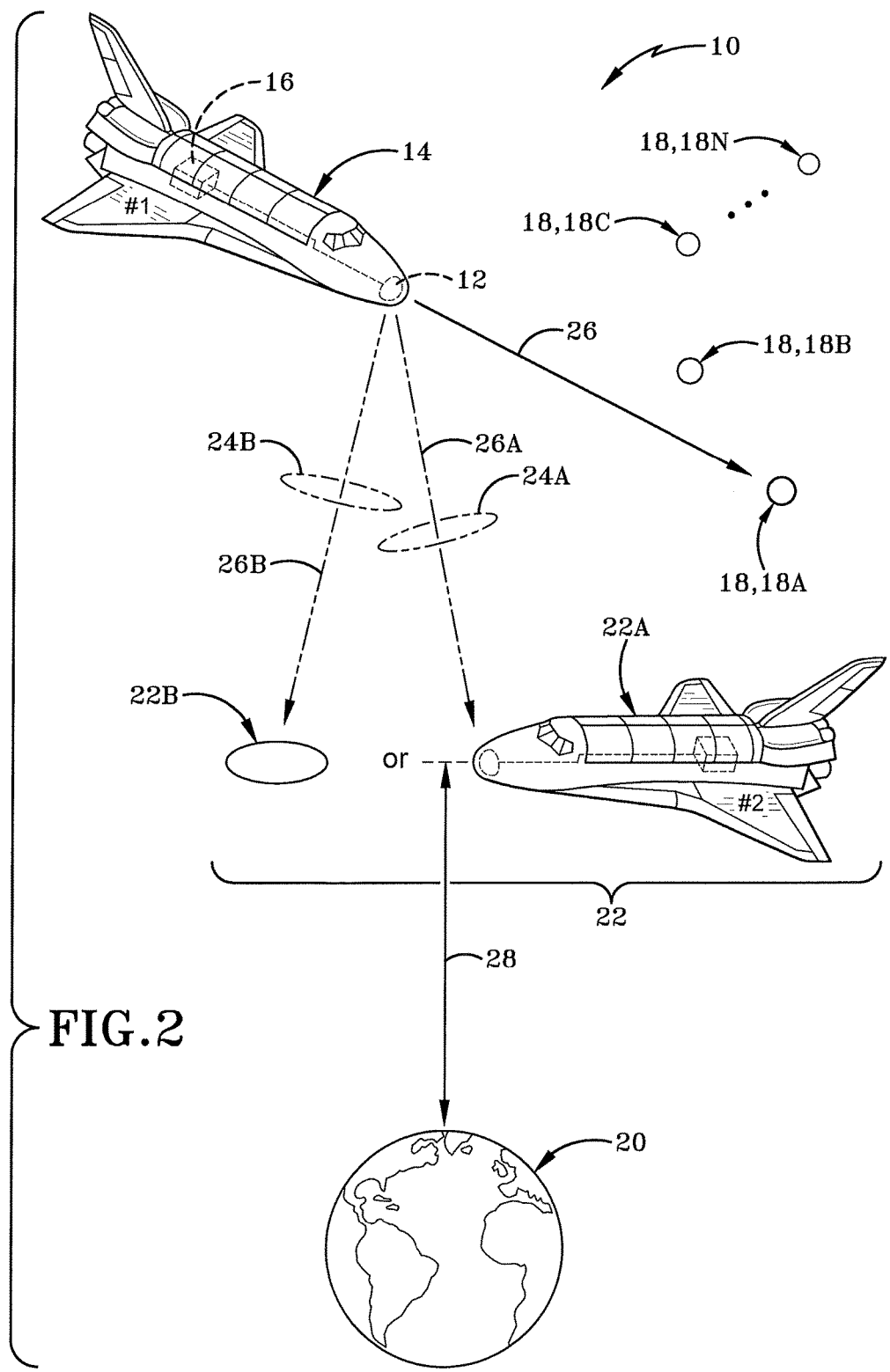
FIG. 2 is a diagrammatic view of a laser communication system utilizing stars and celestial navigation to determine first vehicle attitude in accordance with one embodiment the present disclosure.

As diagrammatically depicted in FIG. 2, one embodiment of the present disclosure provides a laser communication system that is based on stars to obtain a navigation fix using the laser communications payload acquisition and track sensor to reduce the FOU and more rapidly achieve link acquisition is depicted generally at 10. The system 10 includes an acquisition and track sensor (ATS) as part of the laser communications payload 12 carried by a vehicle 14, such as a high altitude aircraft, satellite, space shuttle, or space station (the vehicles 14 may also be referred to herein as a platform or platforms). Notably, this disclosure refers to the laser communication payload as reference numeral 12. However, FIG. 2 is diagrammatic in nature, and it is well understood in the art that the laser communications payload 12 includes the ATS, a local inertial measurement unit (IMU), and a laser. Thus, in some areas of this disclosure, the ATS may also be referred to as reference numeral 12, or alternatively, the local IMU may also be referred to as reference numeral 12, or alternatively, the laser may also be referred to as reference numeral 12, depending on the purpose of the description.

FIG. 2 depicts vehicle 14 as a space shuttle, however it is to be entirely understood that vehicle 14 is not intended to be limiting so long as it carries laser communications payload 12 with its ATS and local IMU. Vehicle 14 also carries a platform high-end inertial navigation system (INS) 16 to serve the platform/vehicle 14 needs. However, portions of the methods, described in greater detail below, accomplishing various objectives of the present disclosure may or may not need IMU. The laser communication system 12 transmits the narrow laser beam 26 therefrom.

The system 10 may further include one or more celestial bodies 18. FIG. 2 depicts a first celestial body 18A, a second celestial body 18B, a third celestial body 18C, and a plurality of additional celestial bodies collectively represented as 18N, wherein N represents any integer greater than 3. The celestial bodies 18 are stars that are identified and known as having relatively fixed positions. The position of the stars 18 is "relatively fixed" because of the vast distance of many light years separating their location from that of vehicle 14. Even if vehicle 14 is moving relative to earth 20, the stars 18 remain relatively fixed because their angular orientation is known to an accuracy less than one microradian.

The stars 18 are at a position that is known and obtained from a star catalog or the bright star catalog. One exemplary non-limiting bright star catalog is the Yale Bright Star Catalog which identifies positions, proper motions, magnitudes, and usually the spectral types of stars and may be ranked in terms of the their brightness as observed from earth. The star catalog of the present disclosure may be stored in a memory of the ATS, however it may also be located elsewhere. For example, the ATS or another processor could by wirelessly linked via the internet or other wireless communication with the star catalog that is remotely stored.

Through the use of the stars 18, the system may establish a celestial fix to determine the position and attitude of the vehicle 14. Establishing the laser communication payload attitude is advantageous, because attitude knowledge enables a rapid acquisition sequence of pointing the laser beam with a reduced FOU toward another platform. As used herein, attitude refers to the roll, pitch, and yaw orientation so the beam may be pointed accurately at a second platform.

The system 10 may further include one or more target platforms collectively shown at 22, wherein one of the target platforms may be a second vehicle 22A and another target platform may be an aircraft or satellite 22B. A second vehicle 22A may be located within a first field of uncertainty 24A. The first field of uncertainty 24A is intermediate the first vehicle 14 and the second vehicle 22A. As will be described in greater detail below, a laser communication link 26A having a narrower beam width than the first field of uncertainty 24A connects and establishes a laser communication link between the first vehicle 14 and the second vehicle 22A.

A second field of uncertainty 24B is located between the satellite 22B and the first vehicle 14. A second laser communication link 26B connects and establishes a laser communication link between the first vehicle 14 and the satellite 22B.

In each scenario where either first laser communication link 26A or second laser communication link 26B is established between the first vehicle 14 and the second vehicle 22A or the satellite 22B, respectively, the connections are occurring at high altitudes above earth 20. High altitude connections are represented by arrow 28. In one particular embodiment, the high altitude associated with connections between first vehicle 14 and either one of the target platforms 22 is occurring in outer space or on the upper boundaries of the earth's atmosphere so as to be near space.

In one embodiment, system 10 enables the communication system to no longer need (i.e., be independent from) the platform IMU to obtain the attitude and low frequency vehicle/platform data to be merged with the high frequency data from the payload IMU and INS in the laser communications payload 3 identified in FIG. 1. By way of non-limiting example, if an air-to-air horizontal link needs to be established, the ATS FOV (and the payload co-boresighted laser) may be pointed up at the first star 18A. The angle relative to the star 18A will establish the laser boresight relative to that star. In order to talk to the second platform (i.e., the second aircraft 22A or satellite 22B), the first platform payload 12 will then point over to that other platform. When the ATS 12 FOV is pointed away from the star, the star reference is lost and no longer provides ATS 12 high frequency data for its pointing jitter. Thus, the local IMU is then used to sense the local high frequency pointing jitter, but the absolute attitude reference in space is retained from the star fix and the gimbal pointing feedback sensors. The star reference is sufficient because it is known what the basic trajectories are for the rotation of the earth and the platform velocity vector.

In one exemplary embodiment, the laser communication system 10 includes a laser communications payload 12 that includes the ATS and the laser that generates beam 26. The system may further include a gimbal that can point the ATS and laser up, down, left, right, and any other direction. The gimbal enables the narrower laser beam 26 and ATS 12 FOV to be pointed within a wider acquisition FOU, either 24A or 24B. The gimbal may point the ATS 12 FOV (and laser beam 26) at either a star or at the other platform. Thus, the wide angle gimbal steering system is pointing a narrow field of view ATS and laser.

The ATS of laser communications payload 12 may include a focal plane array that may be customized to meet specific application needs. The ATS 12 runs software and firmware. The focal plane array of the ATS 12 includes a plurality of pixels. The local IMU 12 collects high frequency data, and is part of the laser communication payload. The platform INS 16 attitude and heading determination system is what system 10, particularly the ATS of laser communication payload 12 as a star tracker, is replacing.

ATS 12 generally includes a narrowband spectral filter at the laser communications wavelength to improve the signal to noise ratio. In an exemplary embodiment, the filter associated with ATS 12 is selectively positioned in front of the ATS field of view. The ATS narrowband communications filter may pivot, or move out of the way, or otherwise be removed from the ATS field of view. In one particular embodiment the narrow communications filter (e.g., in the 1064 nm or 1550 nm region) is removed or replaced by a much wider spectral filter to permit star light with a wide spectral range (e.g., 1000 nm to 1600 nm for an InGaAs ATS) to be imaged onto the ATS 12 during the star tracker function to support the acquisition sequence.

The laser communications ATS 12 has a field of view (FOV) that is about 25× narrower than a conventional star tracker. For example, ATS 12 may have a 200×200 pixels ATS which equals an FOV of 0.3 degrees (equal to about 5 mrad). In contradistinction, a conventional star tracker FOV is about 8 degrees. Thus, a commercial star tracker generally has a much larger FOV and sees many stars. System 10 has ATS 12 with a narrower field of view, but it still doesn't preclude its use as a star tracker. If the ATS 12 is programmed to point to two stars for example, and there are 55 candidate stars, the brightest two that the ATS 12 can see from its location might be (i.e., are likely) separated by more than the narrow field of view of the ATS 12. Thus, the ATS 12 might have to point at a first star 18A and then move the gimbal carrying laser communications payload 12 with ATS 12 in order to point at the second star 18B. Thereafter, the location of the vehicle 14 can establish its location through various triangulation techniques based on the known location of the two stars 18A, 18B and the gimbal pointing angles therefrom.

Furthermore, while the foregoing example utilizes two stars where one star is outside the FOV of the ATS, more stars may be utilized. For example, three stars 18A, 18B, 18C may be used. Typically, commercial conventional star trackers will use two or three stars because they have a larger field of view and can capture more than one star without moving the conventional start tracker.

In order to establish the laser communication link between vehicle 14 and either the second vehicle 22A or the satellite 22B, the ATS utilizes the highly precise (ATS 12 star tracker function) laser communication payload attitude in conjunction with the believed position of the second vehicle 22A or the satellite 22B within their respect fields of uncertainty 24A, 24B. For example, the vehicle has been told ahead of the acquisition sequence that second vehicle 22A is located within first field of uncertainty (FOU) 24A from either ground control or another sensor. Recall that the former technique of target acquisition for laser communication required the ATS to typically search hundreds of locations in the FOU 24A using a spiral or other step-stare pattern, and waiting for a pixel on the focal plane array of the ATS in the second vehicle 22A to indicate detection of the other system's laser beam. This was due to the fact that the vehicle (and hence laser communications payload) absolute attitude was not precisely known due to the inaccuracy and error sources of the platform IMU. By establishing attitude using the ATS 12 celestial fix to establish a highly accurate attitude determination, the laser communications payload ATS 12 of system 10 can more precisely point to the reduced FOU associated with the second vehicle 22A.

With the highly accurate attitude measurements obtained from a celestial fix accomplished by the ATS 12, the system 10 can narrow the number locations (i.e., reduce the FOU) to point the initial laser acquisition beam within the field of uncertainty. The ATS 12 uses the obtained attitude in conjunction with the predicted location within the FOU from ground control to precisely point to the second vehicle 22A. Accordingly, the initial acquisition time frame is expected to be reduced from several minutes to less than ten seconds. Furthermore, analysis indicates the initial acquisition laser generally needs seven or fewer pointing vectors for the laser beam towards the ATS on second vehicle 22A to light up its focal plane array pixel indicating a laser detection.

The laser communications payload 12 further includes a beam director with an optical encoder, resolver, or other pointing vector sensor(s) having an incremental resolution of 1 to 50 microradians. The laser communications payload 12 pointing resolution is highly accurate in this regard. The absolute pointing knowledge (i.e., error) is expected to be dominated by gimbal bearing wobble which can be less than 10 urad for 10 degrees of gimbal motion. For example, suppose that the ATS 12 of system 10 is infinitely accurate. However, when the ATS 12 looks away from the star 18 in order to point at the second platform 22, the dominate inaccuracy becomes the previously known location of ATS 12 because it assumes the inaccuracy of the gimbal pointing to the location of the second platform 22. To solve this error, the gimbals have position encoders in order to know how they're oriented. The gimbal position encoders can be calibrated to an absolute accuracy over a few tens of degrees to be accurate to 100 microradians or less, and that will tend to be the primary error source on how well the ATS 12 and laser 12 points to second platform 22. Thus, the beam director optical encoders reduce the absolute pointing accuracy associated with the payload-pointing gimbals.

The ATS 12 may be an indium gallium arsenide (InGaAs) focal plane array for 1540-1570 nm laser communications, or a silicon array for 1064 nm communications. Typically, InGaAs focal plane arrays have a usable responsivity in a range from about 800 nm to 1600 nm. However, ATS 12 utilizes a silicon window which blocks light energy less than 1050 nm. The spectral region under consideration for ATS 12 when used as a star tracker in accordance with the present disclosure provides a spectral range of 1100 nm to 1600 nm. As will be described in greater detail below, if the silicon window were replaced with ZnS Cleartran or fused silica or similar window, then ATS 12 enables the passing of the broad spectral region of 800 nm to 1600 nm. ATS 12 uses the star tracker prior to the initial acquisition phase and therefore greatly improves open loop FOU absolute pointing uncertainty.

A typical star 18 has a black body temperature comparable to our sun (5800 K), which has twelve percent of its radiated energy in the ATS spectral region of 1100 nm to 1600 nm. By way of comparison, forty-two percent of our sun's radiated energy is in the 400 nm to 700 nm silicon CCD star tracker band utilized by conventional star trackers. Thus, the InGaAs ATS 12 and the optical module with the silicon window will collect about one third as much energy as a typical star tracker when the optical module and the standard star tracker both use a two inch receiving aperture for a 1540-1570 nm laser communications system.

With respect to the celestial bodies 18, there are about 9,110 stars with a magnitude M less than 6.5 according to the Yale Bright Star Catalog, Version Five. The HIPPARCOS Star Catalog provides star positions within less than one microradian accuracy. A typical conventional space craft star tracker has the sensitivity to track all such stars with a brightness M less than six. By way of example, the Goodrich GR-1004 Star Tracker can track magnitude M less than 6.5 stars, with pitch and yaw attitude determination of five microradian RMS. Currently, there are about 199 stars with a magnitude M less than 3.24. It is believed that the laser communications payload ATS 12 could use these 199 stars having a magnitude M less than 3.24 according to the Yale Bright Star Catalog for a celestial position fixed at night (airborne platform) or space vehicle with dark space background.

Daytime sky radiance is more challenging than acquisition against a night sky. Unlike a space craft star tracker or night observations on the ground, a challenge exists that an airborne star tracker must also be viable during daylight hours. At high altitude 28 looking up, plus or minus sixty-five degrees from zenith, the sky is darker, but not black. For the 1100 nm to 1600 nm band of interest, the daytime sky radiance (scattered sunlight) is about $5.0 \times 10^{-5}$ W/cm$^2$-SR-um at altitudes of 45,000 ft or higher.

Daytime sky radiance determines the background flux on each ATS pixel. For example, (5.0E-5 W/cm$^2$-SR-um)(25 urad pixel FOV)$^2$(0.45 um)=1.4E-14 W/cm$^2$ sky background at the aperture, per pixel field of view (FOV).

ATS 12, when used as the initial acquisition star tracker, might typically utilize an 8×8 pixel (or smaller) center of mass (COM) centroiding. The diffraction-limited star image is optimally sized to a 3-pixels diameter blur, with twenty percent of the star energy on each of the four pixels during the tracking sequence. Typically, the IMU+FSM suppression is less than 50 Hz during open-loop pointing jitter. Furthermore, isolators normally suppress vibrations greater than 50 Hz. The sequentially pointed beam director typically might point to and track two or three stars using a 200×200 pixel ATS 12 image for star tracking with a five millirad FOV. The tracked star falls within this narrow field of view, and the celestial navigation provides absolute attitude within 10 microrad (about 2 arcsec).

The 55 brightest stars most commonly used for navigation purposes provide greater than four decibels of excess margin for a daytime position fix from an airborne platform. ATS 12 provides the adjunct star tracker absolute pointing accuracy during this initial acquisition period. The 55 brightest stars according to the Yale Star Catalog can be utilized by ATS 12 during the daytime celestial position fix. However, using the ATS 12 as a star tracker at high altitude 28 is feasible for both day and night operation.

In accordance with an aspect of the present disclosure, the ATS 12 when used as a star tracker, removes the dominant open-loop pointing errors that are typically present in conventional systems (see FIG. 1). In accordance with one exemplary aspect, the following components would accomplish the aforementioned advantage. Collecting aperture of the optical module may have a diameter of about 50 mm for an airborne laser communications platform, and 100-200 mm for a representative space platform. The receiver wavelength region for the star tracker to function is in a range from 1100 nm to 1600 nm for a 1540-1570 nm laser communications system, or 800-1600 nm for a 1064 nm system. In one exemplary embodiment, the ATS 12 has three operational modes, a pre-acquisition mode, a night mode, and a day mode. These modes remove pointing errors before illumination of the target platform. The operational altitude is specific for flight operations, however high altitude 28 operations reduce scattered sunlight. The limiting background in accordance with the system is determined by the sky radiance, however, as described above, the limiting background is removed via background subtraction. Typically, the airborne daytime operational signal to background ratio is in a range from 0.1 to 1.3 before background subtraction occurs. The star irradiance required for tracking in accordance with the present disclosure is in a range from 1100 nm to 1600 nm for daytime is $2.0 \times 10^{-13}$ and for nighttime is $2.0 \times 10^{-14}$ (W/cm$^2$-SR). Operation from a space platform with a black background is much less stressing.

During the daytime, the number of stars suitable for the airborne high altitude tracking in accordance with the present disclosure is the 55 brightest stars in the Yale Catalog having a magnitude M less than 2.24 and during nighttime tracking is 199 stars having a magnitude M less than 3.24. During three axis attitude determination in inertial space, there may be the use of three stars to establish position/attitude of vehicle 14. During the star tracking, the required signal to noise ratio is 7.8 decibels. In an exemplary embodiment, the ATS 12 frame rate for the star tracker is 135 Hz or greater, which avoids residual jitter impact. The signal to noise ratio for star tracking during daytime operation is in a range from 12.1 decibels to 22 decibels after background subtraction has been performed. Excess margin for airborne star tracking in either day mode or night mode is in a range from 4 decibels to 14 decibels.

The open-loop pointing uncertainty to illuminate the target platform is greater than or equal to 100 uR rms. In a representative embodiment, ATS 12 has an initial acquisition of the target platform 22 accomplished in less than seven steps which establishes an initial acquisition in less than ten seconds.

The IMU and INS 16 may still be beneficial as an existing legacy system on vehicle 14. For example, when the laser beam 26 on ATS 12 has affixed star and then pointed to another one of platforms 22, the ATS 12 loses the star to sense. However, IMU and INS 16 can still be used for (relative) low-frequency rigid body attitude changes, versus the ATS 12 star tracker absolute attitude determination at that specific time.

In operation, the spectral filter on ATS 12 establishes the signal to background ratio. For example, when the ATS is in star-tracker mode trying to find one or more stars 18, the ATS 12 is sensitive to 1000 to 1600 nanometers. Thus, the spectral filter doesn't get rid of all of the light, because the sky background also has energy content in that spectral region. Stated otherwise, ATS 12 has hundreds of pixels making a map of what that sky or space background looks like. The ATS 12 indicates how bright each pixel is in terms of this fairly uniform haze that it is the background light. Thus, for each brightness of X, it will show up on a certain pixel there with a brightness that might be 3X or it might be 0.5X. The background haze has a mean average brightness and the photon fluctuation is referred to as "shot noise" and how much it varies with respect to its average is related to the photon fluctuation. In accordance with the present disclosure, a map of the sky background is created. Then, this sky background map is subtracted from the current image when the ATS 12 looking for the star 18, and it makes the stars stand out with respect to the subtracted background because the noise becomes not the average brightness of the sky but the statistical fluctuation and brightness of the sky and that can provide an order of magnitude SNR improvement. This is referred to as a background subtraction scheme.

In addition to the spectral filter on the ATS 12 which generally operates to permit the passage of light in a wavelength range from about 1000 nm to 1600 nm, there is generally a much narrower second filter in operative communication with ATS 12. In one example, the spectral filter is selectively insertable or removable from the ATS 12 FOV (i.e., it can flip out or fold away). The spectral filter will pass the broad wavelength spectral region range of 1000 nm to 1600 nm during the initial celestial fix mode. Then, after the star fix has been performed, the spectral filter may be selective removed and the narrower second filter inserted into the ATS 12 FOV. The narrower second filter has a narrow passband which is required for receiving an incoming laser communication signal with narrow spectral width from the second platform 22. The narrower communications filter passband may be in a wavelength range of 0.3 to 20 nm, depending on the particular laser communications architecture. Typically for the two wavelengths transmitted back and forth between the two platforms that establish the laser communication link (not the initial acquisition), the narrower second filter is required to make the laser communication system work more effectively with adequate SNR. But, in the initial acquisition mode, the wider spectral filter is required to pass more starlight. Thus, in one implementation the narrow second filter may be supported in a little frame/holder that can be moved such that when the star acquisition sequence is occurring, that narrow second filter flips out of the way and lets the 1000-1600 nanometer wavelength light into the ATS and then when the ATS is performing the laser communication with the second platform, the narrow second filter flips back in and covers the field of view to establish the narrow passband range. The filter that flips out of the way may be a piece of glass having about 20 mm diameter and 3 mm thick with many optical coating layers thereon to pass the desired wavelength band and reflect the undesired wavelengths.

Additionally, the laser communications payload 12 may include a transmitter/receiver (i.e., a transceiver) diplexer to pass 50% or more of the unpolarized 1100-1600 nm star light. One exemplary transceiver utilizes a PBS such as a Thor Labs Broadband, but with Infrasil 301 glass for high power. The transmit/receive diplexer sends a several nanometer transmit band for the outbound laser 26 out the telescope, but also receives a several nanometer receive band for the incoming laser from platform 22, to send the received laser energy to the ATS 12 and the laser communications receiver, instead of sending the received laser back toward laser 26. Thus, the diplexer splits the path between the transmit and receive, using wavelength discrimination, and/or polarization discrimination. In conventional laser communication systems, diplexers are typically narrow (a few to tens of nanometers) because of the narrow spectral characteristics of the transmitted and received laser 26. However, in accordance with the present disclosure, system 10 provides a wavelength or polarization diplexer that can pass that a broad spectrum of wavelengths to the receive path, in addition to the narrow communication spectrums identified above. One exemplary diplexer is a polarization beam splitter to achieve this feature of both passing broad receive spectrum and narrow transmit spectrum of light for the establishment of the laser communication system 10. Also applicable is a dichroic wavelength diplexer (i.e. wavelength splitter) with similar characteristics. The ATS 12 with star tracker functionality further employs ARCs (anti-reflection coatings) on the telescope and receiver optics so the ATS 12 transmission is optimum at about 1555 nm, but also highly transmissive in the range of 1100 nm-1600 nm or 800-1600 nm.

In one exemplary non-limiting embodiment, the signal to noise ratio for star tracking is about 7.8 decibels. This 7.8 decibel SNR is representative of a commercial star tracker. After the ATS background subtraction is performed, the SNR identifies a threshold is determined above which the system must operate in order to positively identify a star and not just respond to a noise blip.

The system of the present disclosure is preferably used in high altitude 28 scenarios far above the earth's surface and likely in outer space. However, it may be possible to perform this method within the earth's atmosphere at a lower altitude, but the system and method of the present disclosure would have less stars (i.e. celestial bodies 18) available to it. For example, while not preferable, it is possible to implement the system and method of the present disclosure from an aircraft that's flying at around 10,000 to 30,000 feet because instead of seeing 55 stars at high altitude, the ATS on the low altitude aircraft might only see about 12 stars. Thus, while the system and method of the present disclosure would work at lower altitudes, the higher altitude the aircraft is, the less background light and the more stars are available to establish the navigational attitude fix.

Figure 3:
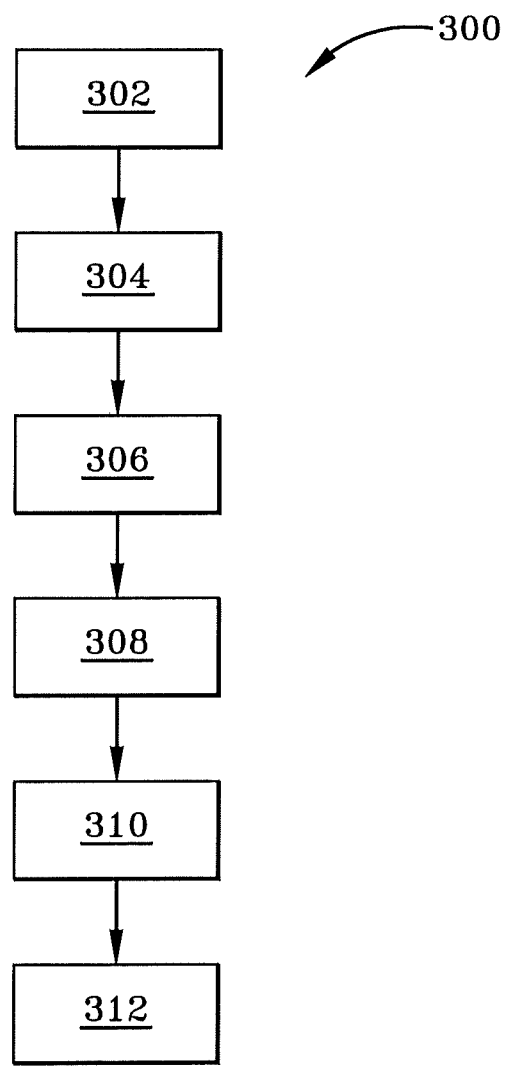
FIG. 3 is a flow chart depicting an exemplary method in accordance with one embodiment the present disclosure.

FIG. 3 depicts an exemplary method 300 in accordance with the present disclosure. The method 300 includes pointing the laser communications payload ATS towards a star 18 having a known location, wherein the laser beam 26 and acquisition tracking sensor (ATS) 12 integral to the laser communications payload on a first platform 14, shown generally at 302. The step of determining attitude of the first platform 14 based, at least in part, on the ATS 12 pointed at the celestial body 18 is shown generally at 304. The step of then pointing the laser beam (co-boresighted to the ATS FOV) within a field of uncertainty, wherein a second platform 22 is within the field of uncertainty 24 but an exact location is not yet known is shown generally at 306. The step of scanning the field of uncertainty 24 with the laser beam until the laser beam illuminates the second platform 22 is shown generally at 308. The step of establishing a laser communication link 26A,26B between the first platform 14 and the second platform 22 is shown generally at 310. And the step of transferring data between the first platform 14 and the second platform 22 over the laser communication link is shown generally at 312.

Additionally, method 300 may further include obtaining the location of the celestial body from a star catalog or registry; observing low frequency platform information including velocity and geolocation of the first platform; and calculating attitude of the first platform based on the location of the celestial body and the low frequency platform information. Method 300 may further include wherein the method is accomplished without a step of performing transfer alignment between the ATS and an inertial measurement unit (IMU) carried by the first platform. Method 300 may further include open loop pointing the laser beam at the second platform to establish initial acquisition with the second platform in less than 10 seconds. Method 300 may further include reducing the field of uncertainty to less than 10% of the FOU for laser communication links between two platforms performing transfer alignment (as exemplified in FIG. 1). Method 300 may further include placing the celestial body within a 5 mrad field of view of the ATS. Method 300 may further include eliminating roll and heading maneuvers prior to in-flight operation of the first platform. Method 300 may further include eliminating offset bias and drift of the ATS by establishing absolute attitude and pointing of the first platform using the laser communications payload ATS. Method 300 may further include initiating an open loop search for the second platform by the first platform; searching for the second platform in an open loop manner; wherein an initial acquisition procedure does not require a step-stare search. Additionally, the method may provide wherein the initial acquisition procedure is accomplished in at most seven steps, wherein one step refers to pointing the laser beam at one location in the field of uncertainty looking for the second platform. Or, the method may provide wherein the initial acquisition procedure is accomplished in at most ten seconds, wherein one step refers to pointing the laser beam at one location in the field of uncertainty looking for the second platform. Method 300 may further include wherein the method is accomplished without GPS knowledge of the ATS location. Method 300 may further include filtering spectral response of the ATS to a spectral range of 1100 nm to 1600 nm for purposes of using it for the celestial navigation fix.

Method 300 may be accomplished by at least one non-transitory computer readable storage medium having instructions encoded thereon that, when executed by one or more processors, result in the following operations for establishing laser communications between two high altitude platforms, the operations comprising: pointing a laser beam towards a star having a relatively fixed position, wherein the laser beam is generated from an acquisition and tracking sensor (ATS) in a laser communication payload carried by a first platform; determining an attitude of the first platform based, at least in part, on the laser beam pointed at and tracking the star; aiming the laser beam towards a second platform within a field of uncertainty about the second platform; scanning the field of uncertainty with the laser beam until the laser beam illuminates the second platform; establishing a laser communication link between the first platform and the second platform; and transferring data between the first platform and the second platform over the laser communication link.

Method 300 may also be accomplished by a system comprising: a legacy inertial navigation system on a first platform, wherein an acquisition and tracking sensor (ATS) is pointed with a co-boresighted laser beam as part of a laser communication link with a second platform; a star at a fixed location as determined by a star catalog; an attitude determination logic module having a processor that calculates the attitude of a laser communication payload on the first platform based in part on the fixed location of the star relative to the first platform; wherein the attitude determination logic further determines a laser boresight for directing the laser beam towards the second platform for establishing a laser communication link therewith; and a laser communication link between the first platform and the second platform established after the attitude of the ATS has been determined based on the location of the star. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics. Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the present disclosure is not limited to the exact details shown or described.

The invention claimed is:

1. A method comprising:
    pointing a laser beam of a laser communication system including an integrated Acquisition and Tracking Sensor (ATS) towards a celestial body having a known location, wherein the laser beam is co-boresighted to the ATS carried by a first platform;
    determining attitude of the first platform based, at least in part, on the ATS of the laser communication system pointed at and tracking the celestial body;
    aiming the laser beam toward a second platform located within a field of uncertainty;
    scanning the field of uncertainty with the laser beam until the laser beam illuminates the second platform;
    establishing a laser communication link between the first platform and the second platform after determining the attitude of the first platform based, at least in part, on the ATS of the laser communication system pointed at and tracking the celestial body; and
    transferring data between the first platform and the second platform over the laser communication link.

2. The method of claim 1, wherein determining attitude of the first platform is accomplished before establishing the laser communication link between the first platform and the second platform by one or more of:
    obtaining the location of the celestial body from a star catalog or registry;
    observing low frequency platform information including rigid body attitude, velocity, and geolocation of the first platform; and
    calculating attitude of the first platform based on the location of the celestial body viewed by the ATS of the laser communication system and the low frequency platform information.

3. The method of claim 1, wherein the method is accomplished without performing transfer alignment between a platform inertial navigation system (INS) and an inertial measurement unit (IMU) carried by the laser communication system on the first platform.

4. The method of claim 1, further comprising:
    open loop pointing of the laser beam at the second platform to establish initial acquisition with the second platform in less than about 10 seconds after determining the attitude of the first platform based, at least in part, on the ATS of the laser communication system pointed at and tracking the celestial body.

5. The method of claim 1, further comprising:
    reducing the field of uncertainty to less than 10% of a field of uncertainty (FOU) for laser communication links between two platforms performing transfer alignment.

6. The method of claim 1, further comprising:
    placing the celestial body within about a 5 mrad field of view of the ATS prior to establishing the laser communication link between the first platform and the second platform.

7. The method of claim 1, further comprising:
    eliminating roll and heading maneuvers prior to in-flight operation of the first platform.

8. The method of claim 1, further comprising:
    eliminating offset bias and drift of the first platform by establishing absolute attitude and pointing of the first platform using the ATS of the laser communications system.

9. The method of claim 1, further comprising:
    initiating an open loop search for the second platform by the first platform after determining the attitude of the first platform based, at least in part, on the ATS of the laser communication system pointed at and tracking the celestial body;
    searching for the second platform in an open loop manner; and
    wherein an initial acquisition procedure does not have a step-stare search.

10. The method of claim 9, wherein the initial acquisition procedure is accomplished in at most seven steps, wherein one step refers to pointing the laser beam at one location in the field of uncertainty looking for the second platform.

11. The method of claim 9, wherein the initial acquisition procedure is accomplished in less than ten seconds, wherein one step refers to pointing the laser beam at one location in the field of uncertainty looking for the second platform.

12. The method of claim 1 that is accomplished without global positioning system (GPS) coordinates of the ATS location.

13. The method of claim 1 further comprising:
    filtering spectral response of the ATS to a spectral range with a wavelength of 1100 nm to 1600 nm to establish a celestial navigation fix.

14. The method of claim 1, further comprising:
    subtracting background sky information from a region of sky where the ATS has been pointed at the celestial body prior to establishing the laser communication link between the first platform and the second platform.

15. A system comprising:
    a legacy inertial navigation system on a first platform including an acquisition and tracking sensor (ATS)

pointed with a co-boresighted laser beam towards a second platform as part of a laser communication link with the second platform;

at least one processor and associated memory for identifying a star at a fixed location from a star catalog;

an attitude determination logic module having a processor that calculates an attitude of a laser communication payload on the first platform based in part on the fixed location of the star relative to the first platform;

wherein the attitude determination logic module further determines a laser boresight for directing the laser beam towards the second platform for establishing the laser communication link therewith; and wherein the laser communication link between the first platform and the second platform is established after the attitude of the ATS has been determined based on the location of the star.

16. The system of claim 15, further comprising:

a filter in operative communication with the ATS for passing star light in a range from 1100 nm to 1600 nm.

17. The system of claim 16, wherein the filter is selectively inserted or removed from the ATS optical path for star tracking or laser communication functionality.

18. At least one non-transitory computer readable storage medium having instructions encoded thereon that, when executed by one or more processors, result in the following operations for establishing laser communications between two platforms, the operations comprising:

pointing a laser beam towards a star having a relatively fixed position, wherein the laser beam is generated from an acquisition and tracking sensor (ATS) in a laser communication payload carried by a first platform;

determining an attitude of the first platform based, at least in part, on the laser beam pointed at and tracking the star;

aiming the laser beam towards a second platform within a field of uncertainty about the second platform;

scanning the field of uncertainty with the laser beam until the laser beam illuminates the second platform;

establishing a laser communication link between the first platform and the second platform after determining the attitude of the first platform based, at least in part, on the ATS of the laser beam pointed at and tracking the star; and transferring data between the first platform and the second platform over the laser communication link.

* * * * *